United States Patent
Matsukura et al.

(10) Patent No.: US 10,443,899 B2
(45) Date of Patent: Oct. 15, 2019

(54) REFRIGERANT CIRCULATION DEVICE, REFRIGERANT CIRCULATION METHOD, REFRIGERANT FILLING METHOD, AND METHOD FOR OPERATING REFRIGERANT CIRCULATION DEVICE

(71) Applicants: MITSUBISHI HEAVY INDUSTRIES THERMAL SYSTEMS, LTD., Tokyo (JP); CENTRAL GLASS CO., LTD., Ube-shi, Yamaguchi (JP)

(72) Inventors: Noriyuki Matsukura, Tokyo (JP); Kenji Ueda, Tokyo (JP); Naoki Kobayashi, Tokyo (JP); Ryosuke Suemitsu, Tokyo (JP); Norihisa Horaguchi, Tokyo (JP); Satoru Okamoto, Kawagoe (JP); Yoshio Nishiguchi, Kawagoe (JP)

(73) Assignees: MITSUBISHI HEAVY INDUSTRIES THERMAL SYSTEMS, LTD., Tokyo (JP); CENTRAL GLASS CO., LTD., Yamaguchi (JP)

( * ) Notice: Subject to any disclaimer, the term of this patent is extended or adjusted under 35 U.S.C. 154(b) by 0 days.

(21) Appl. No.: 15/559,598

(22) PCT Filed: Mar. 28, 2016

(86) PCT No.: PCT/JP2016/059828
§ 371 (c)(1),
(2) Date: Sep. 19, 2017

(87) PCT Pub. No.: WO2016/158822
PCT Pub. Date: Oct. 6, 2016

(65) Prior Publication Data
US 2018/0066871 A1    Mar. 8, 2018

(30) Foreign Application Priority Data
Mar. 31, 2015   (JP) ................................. 2015-073358

(51) Int. Cl.
F25B 1/10    (2006.01)
C09K 5/04    (2006.01)
(Continued)

(52) U.S. Cl.
CPC .................. F25B 1/10 (2013.01); C09K 5/04 (2013.01); C09K 5/041 (2013.01); C09K 5/044 (2013.01);
(Continued)

(58) Field of Classification Search
CPC .......... C09K 5/044; C09K 5/045; C09K 5/04; C09K 2205/126
See application file for complete search history.

(56) References Cited

U.S. PATENT DOCUMENTS 5,440,898 A * 8/1995 Starr ...................... B01D 15/00
210/446
5,481,883 A * 1/1996 Harkness, Jr. .......... F25B 45/00
165/71
(Continued)

FOREIGN PATENT DOCUMENTS

CN    101679154 A    3/2010
CN    102066851 A    5/2011
(Continued)

OTHER PUBLICATIONS

Extended European Search Report dated May 14, 2018 for corresponding European Patent Application No. 16772703.1.
(Continued)

Primary Examiner — Ana M Vazquez
(74) Attorney, Agent, or Firm — Birch, Stewart, Kolasch & Birch, LLP

(57) ABSTRACT

An object of the present invention is to provide a refrigerant circulation device and method that can suppress acid generation caused by decomposition of a refrigerant containing
(Continued)

an HFO or HCFO. The refrigerant circulation device has a compressor, a condenser, expansion valves and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the refrigerant circulation device includes a drive that drives the compressor via a speed increaser, and a drive cooling unit that cools the drive with the refrigerant condensed in the condenser, and a desiccant that can trap moisture is disposed in the evaporator or the drive cooling unit.

15 Claims, 6 Drawing Sheets

(51) Int. Cl.
*F04D 17/12* (2006.01)
*F25B 1/053* (2006.01)
*F25B 45/00* (2006.01)
*F25B 43/00* (2006.01)

(52) U.S. Cl.
CPC .............. *C09K 5/045* (2013.01); *F04D 17/12* (2013.01); *F25B 1/053* (2013.01); *F25B 43/003* (2013.01); *F25B 45/00* (2013.01); *C09K 2205/126* (2013.01); *F25B 2400/13* (2013.01)

(56) References Cited

U.S. PATENT DOCUMENTS

| | | | |
|---|---|---|---|
| 6,454,960 B1* | 9/2002 | Sunaga | C09K 5/045 252/67 |
| 2005/0268641 A1* | 12/2005 | Dekiya | F25B 9/14 62/468 |
| 2010/0163781 A1 | 7/2010 | Sharratt et al. | |
| 2010/0236283 A1* | 9/2010 | Ballet | F25B 13/00 62/513 |
| 2011/0083456 A1 | 4/2011 | Wakamoto et al. | |
| 2011/0237853 A1* | 9/2011 | Hamamatsu | C10G 45/02 585/638 |
| 2011/0312101 A1 | 12/2011 | Tsuchiya et al. | |
| 2013/0031918 A1 | 2/2013 | Yonezawa et al. | |
| 2013/0079562 A1 | 3/2013 | Sharratt et al. | |
| 2014/0077122 A1* | 3/2014 | Fukushima | C09K 5/044 252/67 |
| 2014/0248706 A1 | 9/2014 | Tsuchiya et al. | |
| 2014/0260252 A1 | 9/2014 | Zyhowski et al. | |
| 2014/0360210 A1* | 12/2014 | Lapp | F25B 1/053 62/84 |
| 2016/0137895 A1 | 5/2016 | Kontomaris et al. | |

FOREIGN PATENT DOCUMENTS

| | | |
|---|---|---|
| EP | 2 778 207 A2 | 9/2014 |
| JP | 6-341737 A | 12/1994 |
| JP | 8-86541 A | 4/1996 |
| JP | 8-233380 A | 9/1996 |
| JP | 2001-349643 A | 12/2001 |
| JP | 2002-129179 A | 5/2002 |
| JP | 2002-322999 A | 11/2002 |
| JP | 2003-21406 A | 1/2003 |
| JP | 2003-307197 A | 10/2003 |
| JP | 2005-241081 A | 9/2005 |
| JP | 2007-232353 A | 9/2007 |
| JP | 2008-544072 A | 12/2008 |
| JP | 2012-57812 A | 3/2012 |
| JP | 2012-163243 A | 8/2012 |
| JP | 2012-220124 A | 11/2012 |
| JP | 2013-44490 A | 3/2013 |
| JP | 2014-167368 A | 9/2014 |
| WO | WO 2007/002625 A2 | 1/2007 |
| WO | WO 2010/098451 A1 | 9/2010 |
| WO | WO 2014/022610 A1 | 2/2014 |
| WO | WO 2014/197290 A1 | 12/2014 |

OTHER PUBLICATIONS

International Search Report dated Jun. 21, 2016 for International Patent Application No. PCT/JP2016/059828.
Written Opinion dated Jun. 21, 2016 for International Patent Application No. PCT/JP2016/059828.
Office Action dated Dec. 4, 2018, in Japanese Application No. 2015-073358 with an English Translation.

* cited by examiner (A)

(B)

REFRIGERANT CIRCULATION DEVICE, REFRIGERANT CIRCULATION METHOD, REFRIGERANT FILLING METHOD, AND METHOD FOR OPERATING REFRIGERANT CIRCULATION DEVICE

TECHNICAL FIELD

The present invention relates to a refrigerant circulation device, a refrigerant circulation method, a refrigerant filling method and a method for operating a refrigerant circulation device. The invention relates particularly to a heat pump device and a refrigerating machine, and a refrigerant circulation method, a refrigerant filling method and an operation method for use in those devices.

BACKGROUND ART

Conventionally, hydrofluorocarbon (HFC) based refrigerants have been used as the refrigerants for heat pump devices or refrigerating machines. HFC refrigerants have an ozone depletion potential of zero, and have superior thermal stability. On the other hand, HFC refrigerants have an extremely high global warming potential (GWP) of several hundred to several thousand. As a result, the use of HFC refrigerants is undesirable from the viewpoint of protecting the global environment.

Examples of known refrigerants having a low GWP include hydrofluoroolefin (HFO) based refrigerants and hydrochlorofluoroolefin (HCFO) based refrigerants. In Patent Literature 1, tetrafluoropropene (HFO1234) is used as an HFO refrigerant.

CITATION LIST

Patent literature

{PTL 1}
Japanese Translation of PCT International Application, Publication No. 2008-544072

SUMMARY OF INVENTION

Technical Problem

HFO or HCFO compounds have a double bond in the molecular structure. Accordingly, HFO refrigerants and HCFO refrigerants have lower chemical stability than HFC refrigerants. HFOs are decomposed by OH radicals that can be generated from moisture in the open atmosphere by ultraviolet radiation. Whereas the atmospheric lifetime of HFCs is several years or longer, the atmospheric lifetime of HFOs is a much shorter time of several days to about 30 days. The "atmospheric lifetime" is the time from exposure to the open atmosphere until decomposition by moisture and ultraviolet radiation or the like.

When HFOs and HCFOs oxidize and decompose under the effects of water and oxygen, substances containing mainly acid are generated. Acidic compounds such as hydrogen fluoride, hydrogen chloride and trifluoroacetic acid generated as a result of oxidation and decomposition, or acidic water produced by dissolution of these compounds in water, can cause corrosion of componentry (such as metals and sealing materials) inside equipment.

As mentioned above, HFO or HCFO compounds have a double bond in the molecular structure, and therefore stereoisomers (E isomers and Z isomers) can exist. In heat pump devices having structures in which the refrigerant reaches 100° C. or higher, or in portions near gears or drive mechanisms where high temperatures of 100° C. or higher can be reached due to friction, isomerization reactions may proceed within HFO refrigerants or HCFO refrigerants.

Stereoisomers have the same composition, but different physical properties such as boiling points. Accordingly, when isomerization occurs, the heat transfer characteristics and flow characteristics of the refrigerant change, and the pressure of the refrigerant also changes. For example, if the stereoisomer having a higher boiling point isomerizes, and the amount of the stereoisomer having a lower boiling point increases, then the saturation pressure of the refrigerant increases.

The structure of a device such as a heat pump device is designed for the saturation pressure of the refrigerant used to initially fill the device. However, if the refrigerant isomerizes during operation of the heat pump, then the pressure inside the heat pump increases and can lead to damage of the device.

In circumstances where the physical properties of the refrigerant used during initial refrigerant filling change during operation, a stable heat cycle cannot be maintained.

The present invention has been developed in light of these circumstances, and has an object of providing a refrigerant circulation device and method that can suppress acid generation caused by decomposition of a refrigerant containing an HFO or HCFO.

Further, the present invention also has an object of providing a refrigerant circulation device and method that can prevent equipment damage caused by an isomerization reaction of a refrigerant containing an HFO or HCFO, and maintain a stable heat cycle.

Solution to Problem

In order to achieve the above objects, a refrigerant circulation device, refrigerant circulation method, refrigerant filling method and method for operating a refrigerant circulation device according to the present invention employ the aspects described below.

The present invention provides a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the refrigerant circulation device has a drive that drives the compressor via a speed increaser, and a drive cooling unit that cools the drive with the refrigerant condensed in the condenser, and a desiccant that can trap moisture is disposed in the evaporator or the drive cooling unit.

The evaporator and the drive cooling unit are designed so that the operating temperature of the refrigerant exceeds 0° C. but is less than 100° C. In the evaporator and the drive cooling unit, moisture incorporated in the refrigerant exists in a liquid state. By providing the desiccant, this moisture can be efficiently trapped. As a result, the amount of moisture in the refrigerant is reduced, and corrosion of the refrigerant circulation device can be prevented.

In one aspect of the present invention described above, it is preferable that the evaporator is a shell and tube evaporator having a circular cylindrical container that houses the refrigerant, and a plurality of heat transfer tubes arranged inside the container, and if the distance between the center of the uppermost heat transfer tube and the center of the lowermost heat transfer tube is deemed H, and the direction of gravity is deemed to be downward, then the desiccant is disposed inside the container within a region of ±H from the horizontal plane that includes the central axis of the uppermost heat transfer tube.

The liquid refrigerant accumulates inside the container of the shell and tube evaporator. The liquid refrigerant undergoes heat exchange with the medium passing through the inside of the heat transfer tubes, and sequentially evaporates. When the liquid refrigerant accumulated inside the container contains moisture, the moisture rises above the refrigerant as a result of having a lighter specific gravity. In other words, the moisture exists near the liquid surface of the accumulated liquid refrigerant. The uppermost heat transfer tube is located near the liquid surface of the accumulated liquid refrigerant, and therefore by disposing the desiccant within a height region of ±H relative to the central axis of the uppermost heat transfer tube, the moisture near the liquid surface and the moisture moving toward the liquid surface can be trapped.

In one aspect of the present invention described above, it is preferable that the drive cooling unit has a cooling pipe that functions as a refrigerant passage for guiding the condensed refrigerant to the drive, a filtration unit provided partway along the cooling pipe, and a throttle valve that throttles the refrigerant passage on the upstream side of the filtration unit, wherein the desiccant is disposed inside the filtration unit.

By disposing the desiccant in the filtration unit, the moisture can be trapped together with any suspended matter (contaminants) contained in the condensed refrigerant. In the aspect of the present invention described above, by providing the throttle valve on the upstream side of the filtration unit, the temperature of the refrigerant entering the filtration unit can be lowered. As a result, even in a device in which the temperature of the refrigerant exiting the condenser is high, the filtration unit can be protected from heat damage.

In one aspect of the present invention described above, an acid acceptor that traps acid is preferably disposed together with the desiccant.

By disposing an acid acceptor together with the desiccant, if the hydrofluoroolefin (HFO) or hydrochlorofluoroolefin (HCFO) contained in the refrigerant decomposes, then the acid generated by that decomposition can be trapped, and any increase in the acid concentration can be suppressed.

In one aspect of the present invention described above, gate valves that open and close the refrigerant passage may be provided on the upstream side and the downstream side of the filtration unit.

By providing gate valves on the upstream side and the downstream side of the filtration unit, a structure is obtained in which the desiccant (and the acid acceptor) can be easily replaced. Accordingly, the desiccant (and the acid acceptor) can be replaced as necessary.

In one aspect of the present invention described above, the refrigerant circulation device may have a throttle valve that throttles the refrigerant passage on the downstream side of the filtration unit.

By providing throttle valves on the upstream side and the downstream side, the position at which the refrigerant passage is throttled can be altered as appropriate in accordance with the refrigerant temperature.

In one aspect of the present invention described above, a plurality of filtration units may be provided in parallel partway along the cooling pipe, and gate valves that open and close the refrigerant passage may be provided on the upstream side and the downstream side of each filtration unit.

By using the structure described above, the desiccant (and the acid acceptor) can be replaced without stopping operation.

In one aspect of the present invention described above, the refrigerant circulation device includes a lubricating oil circulation unit that circulates a lubricating oil through a casing that houses the speed increaser, and the circulated lubricating oil preferably contains an aromatic-based or phenol-based antioxidant. The lubricating oil preferably contains at least 0.2% by mass but not more than 1.5% by mass of the antioxidant.

By using an aromatic-based or phenol-based antioxidant, a superior antioxidant effect can be obtained compared with those cases where other antioxidants are used. When the lubricating oil is compatible with the refrigerant containing the hydrofluoroolefin (HFO) or hydrochlorofluoroolefin (HCFO), the antioxidant can prevent oxidation of the refrigerant. By ensuring that the antioxidant content satisfies the above range, the desired antioxidant effect can be achieved.

In one aspect of the present invention described above, the refrigerant circulation device includes a lubricating oil circulation unit that circulates a lubricating oil through a casing that houses the speed increaser, and the circulated lubricating oil preferably contains an ether-based or epoxy-based acid acceptor. The lubricating oil preferably contains at least 0.2% by mass but not more than 3% by mass of the acid acceptor.

By using an ether-based or epoxy-based acid acceptor, a superior acid trapping effect can be obtained compared with those cases where other acid acceptors are used. When the lubricating oil is compatible with the refrigerant containing the HFO or HCFO, the acid acceptor can trap acid in the refrigerant. By ensuring that the acid acceptor content satisfies the above range, the desired acid trapping effect can be achieved.

In one aspect of the present invention described above, the amount of the acid acceptor contained in the lubricating oil is preferably larger than the amount of the antioxidant.

The HFO or HCFO contained in the refrigerant decomposes during operation, causing an increase in the acid concentration in the refrigerant. Although HFOs and HCFOs decompose more easily than HFCs, by including the acid acceptor in a larger amount than the antioxidant, any increase in the acid concentration can be suppressed. Because the refrigerant circulation circuit is a closed circuit, there is little risk of oxygen entering the circuit from outside during operation of the device. The antioxidant is preferably added in an amount that is sufficient to trap the residual oxygen in the device following the initial filling of the refrigerant.

In one aspect of the present invention described above, it is preferable that the refrigerant circulation device includes a metal refrigerant supply pipe, which is connected to the main pipe and functions as a passage for supplying the refrigerant to the refrigerant circulation circuit, and this refrigerant supply pipe preferably has a refrigerant source connection port to which a refrigerant source is connected, a first on-off valve that opens and closes the refrigerant source connection port, an exhaust unit connection port to which an exhaust unit is connected, and a second on-off valve that opens and closes the exhaust unit connection port. The refrigerant supply pipe is preferably formed from stainless steel.

In the case of a metal (and preferably stainless steel) refrigerant supply pipe, penetration of outside oxygen through the pipe wall into the inside of the pipe is essentially nonexistent. By performing refrigerant filling through this type of refrigerant supply pipe, penetration of oxygen into the refrigerant circulation circuit during refrigerant filling can be prevented. The exhaust unit can be connected to the exhaust unit connection port. Because the refrigerant supply pipe has the first on-off valve and the second on-off valve, the inside of the refrigerant supply pipe can be evacuated down to a desired degree of vacuum using the exhaust unit before performing refrigerant filling. Because the refrigerant filling can be performed after lowering the amount of oxygen inside the refrigerant supply pipe, decomposition of the HFO and HCFO contained in the refrigerant can be suppressed.

In one aspect of the present invention described above, the refrigerant circulation device preferably includes a notification unit, which measures the condensing pressure and the evaporating pressure of the refrigerant during operation, and notifies the timing for refrigerant replacement when the measured value of at least one of the condensing pressure and the evaporating pressure falls outside a predetermined tolerance.

By providing the notification unit, even in those cases where the HFO or HCFO contained in the refrigerant isomerizes, causing a change in the pressure inside the refrigerant circulation circuit, the refrigerant can be replaced before excessive load is placed on the members that constitute the refrigerant circulation circuit. As a result, equipment damage can be prevented.

In one aspect of the present invention described above, the refrigerant used for the initial filling preferably has a stereoisomer ratio for which the fluctuation ranges for the condensing pressure and the evaporating pressure of the refrigerant during operation fall within prescribed ranges.

The "stereoisomer ratio" describes the abundance ratio between the E isomer and the Z isomer in the HFO or HCFO contained in the refrigerant. In an isomerization reaction, conversion from the Z isomer to the E isomer, and conversion from the E isomer to the Z isomer can both occur reciprocally. Accordingly, if the conversion from the E isomer to the Z isomer and the conversion from the Z isomer to the E isomer occur reciprocally at a similar level, then no large fluctuation occurs in the abundance ratio between the E isomer and the Z isomer. By performing initial filling of the refrigerant circulation circuit using a refrigerant that has been prepared with that type of stereoisomer ratio, a stable heat cycle can be maintained.

The present invention also provides a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the refrigerant circulation device has a metal refrigerant supply pipe, which is connected to the main pipe and functions as a passage for supplying the refrigerant to the refrigerant circulation circuit, and the refrigerant supply pipe has a refrigerant source connection port to which a refrigerant source is connected, a first on-off valve that opens and closes the refrigerant source connection port, an exhaust unit connection port to which an exhaust unit is connected, and a second on-off valve that opens and closes the exhaust unit connection port.

The present invention also provides a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the refrigerant used for initial filling of the refrigerant circulation circuit has a stereoisomer ratio for which the fluctuation ranges for the condensing pressure and the evaporating pressure of the refrigerant during operation fall within prescribed ranges.

The present invention also provides a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the refrigerant circulation device includes a notification unit, which measures the condensing pressure and the evaporating pressure of the refrigerant during operation, and notifies the timing for refrigerant replacement when the measured value of at least one of the condensing pressure and the evaporating pressure falls outside a predetermined tolerance.

Furthermore, the present invention also provides a refrigerant circulation method for use in a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the method involves circulating the refrigerant with a desiccant that can trap moisture disposed in a location where the operating temperature of the refrigerant exceeds 0° C. but is less than 100° C.

In one aspect of the present invention described above, it is preferable that the evaporator is a shell and tube evaporator having a circular cylindrical container that houses the refrigerant, and a plurality of heat transfer tubes arranged inside the container, and if the distance between the center of the uppermost heat transfer tube and the center of the lowermost heat transfer tube is deemed H, and the direction of gravity is deemed to be downward, then the desiccant is disposed inside the container within a region of ±H from the horizontal plane that includes the central axis of the uppermost heat transfer tube.

In one aspect of the present invention described above, the condensed refrigerant is preferably guided through a filtration unit having the desiccant disposed therein, to a drive that drives the compressor, thereby cooling the drive.

In one aspect of the present invention described above, an acid acceptor that traps acid is preferably disposed together with the desiccant.

In one aspect of the present invention described above, an aromatic-based or phenol-based antioxidant is preferably added to a lubricating oil supplied to the refrigerant circulation device. The amount added of the antioxidant is preferably at least 0.2% by mass but not more than 1.5% by mass.

In one aspect of the present invention described above, an ether-based or epoxy-based acid acceptor is preferably added to the lubricating oil supplied to the refrigerant circulation device. The amount added of the acid acceptor is preferably at least 0.2% by mass but not more than 3% by mass.

The amount of the acid acceptor added to the lubricating oil is preferably larger than the amount of the antioxidant.

In one aspect of the present invention described above, it is preferable that the acid value of the lubricating oil circulating in the refrigerant circulation device is measured, and the lubricating oil is replaced when the acid value of the lubricating oil exceeds 0.5 mgKOH/g.

By replacing the lubricating oil on the basis of the measured acid value of the lubricating oil, corrosion of the structural members (such as metals and sealing materials) of the refrigerant circulation device can be prevented.

In one aspect of the present invention described above, it is preferable that a refrigerant supply pipe connected to the main pipe is a metal pipe, and the inside of the refrigerant supply pipe is evacuated so that the amount of oxygen remaining in the refrigerant circulation circuit relative to the amount of refrigerant to be filled is less than 50 ppm (mass/mass), the refrigerant is subsequently used to fill the refrigerant circulation circuit, and the refrigerant is then circulated. The refrigerant supply pipe is preferably formed from stainless steel.

By using a metal refrigerant supply pipe, penetration of outside oxygen during refrigerant filling can be prevented. By ensuring that the amount of oxygen remaining inside the refrigerant circulation circuit relative to the amount of refrigerant to be filled is less than 50 ppm (mass/mass), decomposition of the HFO or HCFO contained in the refrigerant during operation can be suppressed. As a result, any increase in the acid concentration in the refrigerant can be suppressed, and corrosion of the structural members (such as metals and sealing materials) of the refrigerant circulation device can be prevented.

In one aspect of the present invention described above, it is preferable that the condensing pressure and the evaporating pressure of the refrigerant are measured during operation, and the refrigerant is replaced when the measured value of at least one of the condensing pressure and the evaporating pressure falls outside a predetermined tolerance.

In one aspect of the present invention described above, a stereoisomer ratio is acquired that ensures that the fluctuation ranges for the condensing pressure and the evaporating pressure of the refrigerant during operation fall within prescribed ranges, initial refrigerant filling is then performed at that stereoisomer ratio, and the refrigerant is then circulated.

The present invention also provides a refrigerant filling method for use in a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the refrigerant supply pipe connected to the main pipe is a metal pipe, the inside of the refrigerant supply pipe is evacuated so that the amount of oxygen remaining in the refrigerant circulation circuit relative to the amount of refrigerant to be filled is less than 50 ppm (mass/mass), and the refrigerant is then used to fill the refrigerant circulation circuit.

The present invention also provides a refrigerant filling method for use in a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein a stereoisomer ratio is acquired that ensures that the fluctuation ranges for the condensing pressure and the evaporating pressure of the refrigerant during operation fall within prescribed ranges, and initial refrigerant filling is then performed at that stereoisomer ratio.

The present invention also provides a method for operating a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within the molecular structure, wherein the condensing pressure and the evaporating pressure of the refrigerant are measured during operation, and the refrigerant is replaced when the measured value of at least one of the condensing pressure and the evaporating pressure falls outside a predetermined tolerance.

Advantageous Effects of Invention

The refrigerant circulation device, refrigerant circulation method and refrigerant filling method of the present invention enable suppression of acid generation caused by decomposition of refrigerants containing an HFO or HCFO. As a result, corrosion of the members that constitute the refrigerant circulation device can be prevented.

The refrigerant circulation device, refrigerant circulation method, refrigerant filling method and method for operating a refrigerant circulation device according to the present invention can suppress pressure variations inside the device caused by isomerization reactions of refrigerants containing an HFO or HCFO, meaning a stable heat cycle can be maintained.

DESCRIPTION OF EMBODIMENTS

{First Embodiment}

Figure 1:
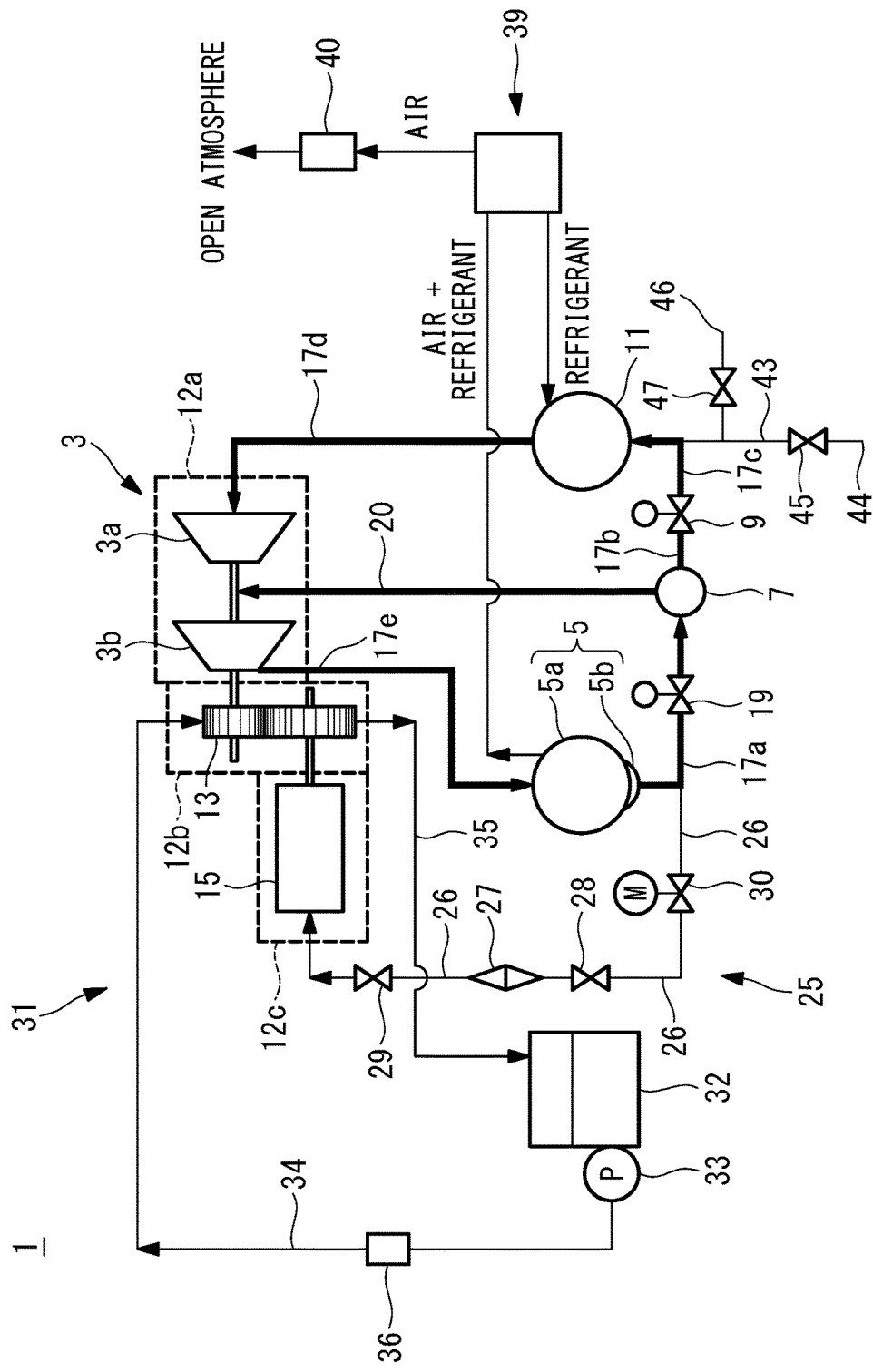
{FIG. 1} A schematic illustration of a refrigerant circulation device according to a first embodiment.

A heat pump device according to this embodiment has a refrigerant circulation circuit filled with a refrigerant containing a hydrofluoroolefin (HFO) or a hydrochlorofluoroolefin (HCFO) (hereafter referred to as an HFO refrigerant or an HCFO refrigerant respectively). The hydrofluoroolefin (HFO) or hydrochlorofluoroolefin (HCFO) is a refrigerant having a carbon-carbon double bond within the molecular structure.

The refrigerant preferably contains the HFO or HCFO as the main component. The amount of the HFO or HCFO in the refrigerant is typically greater than 50% by mass, preferably greater than 75% by mass, and even more preferably greater than 90% by mass.

Specific examples of the hydrofluoroolefin (HFO) include (Z)-1,3,3,3-tetrafluoro-1-propene (HFO1234ze(Z)), (E)-1,3,3,3-tetrafluoro-1-propene (HFO1234ze(E)), 2,3,3,3-tetrafluoro-1-propene (HFO1234yf), (Z)-1,2,3,3,-tetrafluoro-1-propene (HFO1234ye(Z)), (E)-1,2,3,3,-tetrafluoro-1-propene (HFO1234ye(E)), (Z)-1,2,3,3,3-pentafluoro-1-propene (HFO1225ye(Z)), (E)-1,2,3,3,3-pentafluoro-1-propene (HFO1225ye(E)), (Z)-1,1,1,4,4,4-hexafluoro-2-butene (HFO1336mzz(Z)), and (E)-1,1,1,4,4,4-hexafluoro-2-butene (HFO1336mzz(E)).

Specific examples of the hydrochlorofluoroolefin (HCFO) include (E)-1-chloro-3,3,3-trifluoropropene (HCFO1233zd (E)), (Z)-1-chloro-3,3,3-trifluoropropene (HCFO1233zd (Z)), (E)-1,2-dichloro-3,3,3-trifluoropropene (HCFO1223xd (E)), and (Z)-1,2-dichloro-3,3,3-trifluoropropene (HCFO1223xd(Z)).

The purity of the HFO or HCFO is preferably at least 97% by mass, more preferably at least 99% by mass, and even more preferably 99.9% by mass or higher.

The refrigerant may contain one or more additives. Examples of these additives include halocarbons, other hydrofluorocarbons (HFC), alcohols, and saturated hydrocarbons.

<Halocarbons and Other Hydrofluorocarbons>

Examples of the halocarbons include compounds containing one or more halogen atoms such as methylene chloride, trichloroethylene and tetrachloroethylene.

Examples of the hydrofluorocarbons include difluoromethane (HFC-32), 1,1,1,2,2-pentafluoroethane (HFC-125), fluoroethane (HFC-161), 1,1,2,2-tetrafluoroethane (HFC-134), 1,1,1,2-tetrafluoroethane (HFC-134a), 1,1,1-trifluoroethane (HFC-143a), difluoroethane (HFC-152a), 1,1,1,2,3,3,3-heptafluoropropane (HFC-227ea), 1,1,1,2,3-pentafluoropropane (HFC-236ea), 1,1,1,3,3,3-hexafluoropropane (HFC-236fa), 1,1,1,3,3-pentafluoropropane (HFC-245fa), 1,1,1,2,3-pentafluoropropane (HFC-245eb), 1,1,2,2,3-pentafluoropropane (HFC-245ca), 1,1,1,3,3-pentafluorobutane (HFC-365mfc), 1,1,1,3,3,3-hexafluoroisobutane (HFC-356mmz), and 1,1,1,2,2,3,4,5,5,5-decafluoropentane (HFC-43-10-mee).

<Alcohols>

Examples of the alcohols include alcohols having a carbon number of 1 to 4, and specific examples include methanol, ethanol, n-propanol, i-propanol, n-butanol, i-butanol, 2,2,2-trifluoroethanol, pentafluoropropanol, tetrafluoropropanol, and 1,1,1,3,3,3-hexafluoro-2-propanol.

<Saturated Hydrocarbons>

Examples of the saturated hydrocarbon include saturated hydrocarbons having a carbon number of at least 3 but not more than 8, and specific examples include at least one compound selected from the group consisting of propane, n-butane, i-butane, neopentane, n-pentane, i-pentane, cyclopentane, methylcyclopentane, n-hexane and cyclohexane. Among these, particularly preferred compounds include neopentane, n-pentane, i-pentane, cyclopentane, methylcyclopentane, n-hexane and cyclohexane.

FIG. 1 is a schematic diagram illustrating one example of a heat pump device (refrigerant circulation device) filled with the above refrigerant.

The heat pump device 1 includes a compressor 3 that compresses the refrigerant, a condenser 5 that condenses the refrigerant compressed by the compressor 3, an economizer 7 that cools the liquid refrigerant from the condenser 5, a main expansion valve 9 that expands the liquid refrigerant from the economizer 7, and an evaporator 11 that evaporates the refrigerant that has been expanded by the main expansion valve 9. The compressor 3, the condenser 5, the economizer 7, the main expansion valve 9 and the evaporator 11 are connected by a main pipe (17a, 17b, 17c, 17d, 17e) to form a closed system through which the refrigerant is circulated (namely, a heat pump cycle or refrigerant circulation circuit). Each of the structural members of the heat pump device 1 are designed to withstand the pressure from the refrigerant. The heat pump device 1 can output hot water of 200° C.

The compressor 3 is a centrifugal compressor that can generate a high pressure ratio. The compressor 3 can increase the temperature of the refrigerant to about 230° C. The compressor 3 has two impellers 3a and 3b provided on the same axis inside a casing 12a, and an input vane (not shown in the drawing) for adjusting the flow rate of the introduced refrigerant.

Each of the impellers 3a and 3b is rotated by a drive 15 via a speed increaser 13. The drive 15 is an electric motor. The electric motor may operate by varying the rotational frequency using an inverter unit. The rotational frequency of the drive 15 is controlled by a control unit not shown in the drawing.

The two impellers 3a and 3b are connected in series relative to the refrigerant passage. The refrigerant introduced into the compressor 3 is compressed by the upstream impeller 3a, and then further compressed by the downstream impeller 3b. Gaseous refrigerant is introduced at a location (intermediate stage) between the two impellers 3a and 3b from the economizer 7 described below.

The condenser 5 provided downstream from the compressor 3 is designed to capture the latent heat of condensation of the refrigerant using cooling water. A shell and tube heat exchanger can be used favorably as the condenser 5, but a plate heat exchanger may also be used.

The condenser 5 is formed from a main condenser 5a and an auxiliary condenser 5b known as a sub-cooler. The refrigerant is introduced sequentially into the main condenser 5a and then the auxiliary condenser 5b. The liquid refrigerant that has been condensed in the condenser 5 passes through the main pipe 17a and into the economizer 7.

The economizer 7 is a plate heat exchanger or a gas-liquid separation tank. A secondary expansion valve 19 is provided in the main pipe 17a, and the liquid refrigerant flowing into the economizer 7 is cooled by decompression and expansion. The secondary expansion valve 19 is an electronic expansion valve, the degree of opening of which is controlled by a control unit not shown in the drawing.

In the economizer 7, gas and liquid are separated. The separated gaseous refrigerant passes through an economizer outlet gas passage 20 and is guided into the intermediate stage of the compressor 3 (the location between the upstream impeller 3a and the downstream impeller 3b). The main expansion valve 9 is connected to the liquid refrigerant outlet of the economizer 7 via the main pipe 17b. The liquid refrigerant that has been cooled by the economizer 7 passes through the main pipe 17b and into the main expansion valve 9.

The main expansion valve 9 is an electronic expansion valve or an electric ball valve, the degree of opening of which is controlled by a control unit not shown in the drawing. The main expansion valve 9 subjects the liquid refrigerant flowing through the main pipe to decompression and expansion. Having undergone decompression and expansion in the main expansion valve 9, the liquid refrigerant passes though the main pipe 17c and into the evaporator 11.

The evaporator 11 has heat transfer tubes 11b inside a container 11a. A cold water pipe (not shown in the drawings) is connected in a manner that enables cold water to be supplied to the heat transfer tubes in accordance with the external heat load. In the evaporator 11, the cold water is cooled by the latent heat of vaporization of the liquid refrigerant inside the evaporator during passage through the heat transfer tubes 11b. The gaseous refrigerant that is vaporized by the evaporator 11 passes through the main pipe 17d and is guided into an inlet of the compressor 3 (upstream from the upstream impeller 3a).

Figure 2:
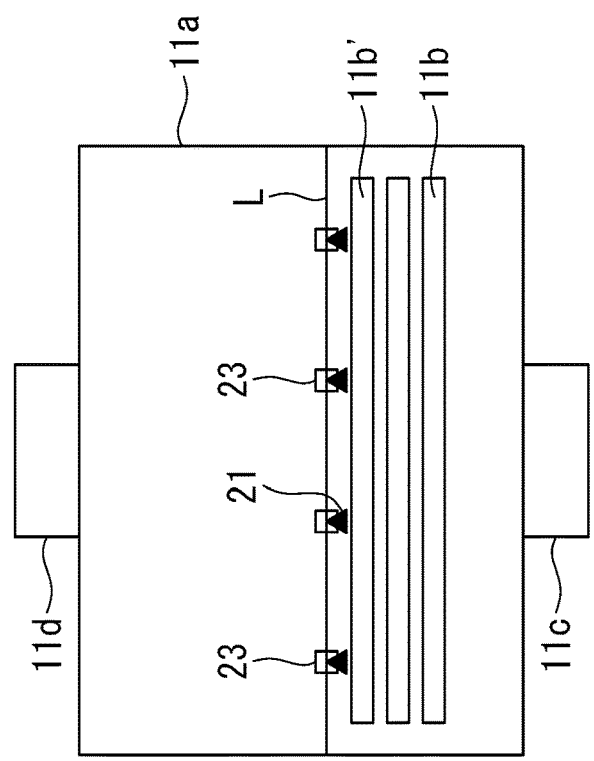
{FIG. 2} Cross-sectional views of an evaporator according to the first embodiment.
Figure 2:
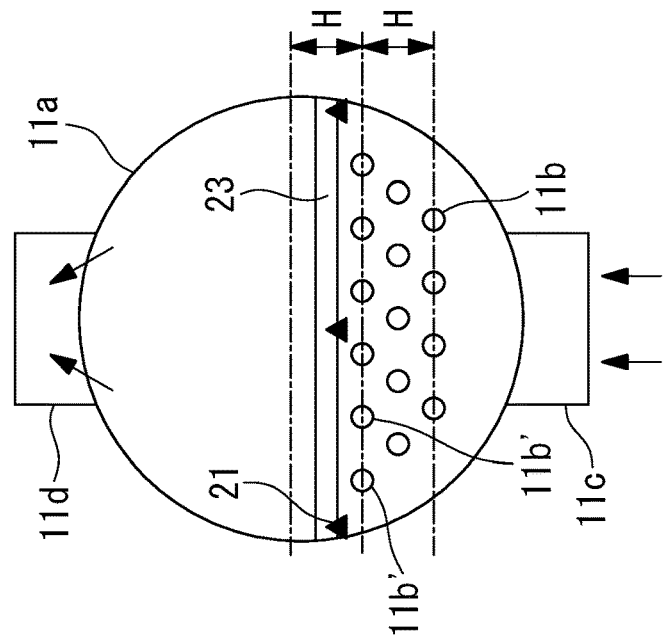

The evaporator 11 is a shell and tube heat exchanger. FIG. 2 illustrates cross-sectional views of the evaporator. In these drawings, FIG. 2(A) is a transverse sectional view of the evaporator, and FIG. 2(B) is a longitudinal sectional view. The evaporator includes the container 11a, which has a circular cylindrical shape that is laid horizontally so that the axis of the cylinder is horizontal, and the plurality of heat transfer tubes 11b and 11b', which are provided so as to extend along the axial direction (the lengthwise direction) of the circular cylindrical container. The temperature inside the evaporator during operation exceeds 0° C. but is less than 100° C.

A refrigerant inlet 11c is provided in the bottom of the container 11a. In the evaporator 11, the refrigerant introduced from the refrigerant inlet 11c passes through a perforated plate (not shown in the drawings) and is guided toward the heat transfer tubes 11b and 11b'. Upon passage through the perforated plate, the refrigerant entering from the bottom is distributed along the lengthwise direction of the container 11a, so that the refrigerant is guided along the entire length of the heat transfer tubes 11b and 11b' that extend along the lengthwise direction. The liquid surface L of the liquid refrigerant introduced into the container 11a is indicated in FIG. 2(B). By ensuring that this liquid surface L is positioned above the uppermost heat transfer tubes 11b', a state is obtained in which all of the heat transfer tubes 11b and 11b' are immersed in the liquid refrigerant.

The latent heat of vaporization is captured by the cold water flowing through the insides of the heat transfer tubes 11b and 11b', and the vaporized gaseous refrigerant flows toward the top of the inside of the container 11a and is guided toward a refrigerant outlet 11d provided at the top of the container 11a. The refrigerant outlet 11d is connected to the main pipe 17d (see FIG. 1), and the gaseous refrigerant is guided into the compressor 3.

If the direction of gravity is deemed to be downward, then a desiccant 21 is disposed inside the container of the evaporator 11 at a height location within a region of ±H from the horizontal plane that includes the central axis of the uppermost heat transfer tubes 11b' (closest to the refrigerant outlet). Here, "H" is the distance between the center of the uppermost heat transfer tubes and the center of the lowermost heat transfer tubes. The term "height" refers to a distance in the vertical direction. The desiccant 21 may be disposed on the inner surface of the container 11a, or disposed on a stay 23 provided at a prescribed location inside the container. Examples of the desiccant 21 include molecular sieves and silica gels. The desiccant 21 is preferably granular, or a block obtained by sintering a powder, and is positioned so as to undergo total contact (immersion) within the liquid refrigerant and the lubricating oil.

If the direction of gravity is deemed to be downward, then an acid acceptor is preferably disposed inside the container of the evaporator 11 (although not shown in the drawings), at a height location within a region of ±H from the horizontal plane that includes the central axis of the uppermost heat transfer tubes 11b' (closest to the refrigerant outlet). In a similar manner to the desiccant, the acid acceptor may be disposed on the inner surface of the container 11a, or disposed on the stay 23 provided at a prescribed location inside the container. The acid acceptor is an activated alumina. The acid acceptor is preferably granular, or a block obtained by sintering a powder, and is mixed with the desiccant and disposed within the flow passage. Alternatively, the acid acceptor may be coated onto the inside of the pipes.

A control unit (not shown in the drawings) for the heat pump device 1 is provided on a control board within a control panel of the heat pump device 1, and includes a CPU and memory. The control unit calculates each of various control amounts by digital computation for every control period, based on the temperature of the cooling water, the refrigerant pressure, and the refrigerant temperature at the inlets and outlets and the like.

The heat pump device 1 includes a drive cooling unit 25 that cools the drive 15, a lubricating oil circulation unit 31 that circulates the lubricating oil through the casing 12b that houses the speed increaser 13, a gas bleed unit 39 for bleeding gas from the refrigerant circulation circuit, and a refrigerant supply pipe 43 for supplying the refrigerant to the refrigerant circulation circuit.

The drive cooling unit 25 is designed to cool the drive 15 using a portion of the liquid refrigerant that has been condensed by the condenser 5. The drive cooling unit 25 includes a cooling pipe 26, which links the main pipe 17a on the outlet side of the condenser 5 and a casing 12c that houses the drive 15, and functions as a passage for the refrigerant, a filter dryer (filtration unit) 27 provided partway along the cooling pipe 26, gate valves 28 and 29 provided upstream and downstream respectively of the filter dryer 27, and a throttle valve 30 provided on the upstream side of the filter dryer 27 and the gate valve 28.

The filter dryer 27 has a filter that removes contaminants within the refrigerant and a desiccant that traps moisture (not shown in the drawing). The filter dryer 27 preferably also has an acid acceptor that traps acid (not shown in the drawing) as well as the desiccant. The desiccant and the acid acceptor have the same composition as those provided in the evaporator 11. The filter dryer 27 is provided partway along the cooling pipe, and in order to reduce pressure loss and increase the probability of contact with the refrigerant, the internal diameter of the filter dryer 27 is enlarged to several times the internal diameter of the cooling pipe. The desiccant and the acid acceptor are spread right through the filter dryer with as few gaps as possible.

The gate valves 28 and 29 may be manual valves, and can be used when the filter dryer 27 requires replacement. The throttle valve 30 includes an electric motor. The degree of opening of the throttle valve 30 is controlled by a control unit not shown in the drawing, so that the refrigerant temperature during operation exceeds 0° C. but is less than 100° C.

The lubricating oil circulation unit 31 can circulate a lubricating oil through the casing 12b housing the speed increaser 13. The lubricating oil circulation unit 31 includes a lubricating oil tank 32 for storing the lubricating oil, a pump 33 that outputs the lubricating oil, an oil supply pipe 34 that links the lubricating oil tank 32 and the casing of the speed increaser 13, and functions as a lubricating oil supply passage, an oil discharge pipe 35 that functions as a discharged oil passage that returns the oil discharged from the casing of the speed increaser 13 to the lubricating oil tank 32, and an oil filter 36 provided partway along the oil supply pipe 34. The lubricating oil tank 32 has an injection port and a discharge port for the lubricating oil (not shown in the drawing). The oil filter 36 filters out contaminants and sludge and the like contained in the lubricating oil. The oil filter 36 is formed from a filter material such as polypropylene, polyethylene terephthalate or Teflon (a registered trademark).

The lubricating oil may be selected from among mineral oils, ester-based oils, ether-based oils, glycol-based oils, and alkylbenzene-based oils. The lubricating oil is preferably an oil that is compatible with the refrigerant. In the case of HFO refrigerants containing no chlorine in the molecule, the lubricating oil is preferably selected from among ester-based oils, ether-based oils and glycol-based oils, and ester-based oils are particularly desirable. In the case of HCFO refrigerants which contain chlorine in the molecule, the lubricating oil is preferably selected from among mineral oils, ester-based oils, ether-based oils, glycol-based oils and alkylbenzene-based oils, and mineral oils are particularly desirable. The lubricating oil preferably contains an antioxidant that traps oxygen. The antioxidant is added to the lubricating oil in an amount that is preferably at least 0.2% by mass but not more than 1.5% by mass, and more preferably at least 0.2% by mass but not more than 1.0% by mass.

The antioxidant is an aromatic-based or phenol-based antioxidant. Examples of the antioxidant include 2,6-di-tert-butylhydroxytoluene, 4,4'-methylenebis(2,6-di-tert-butylhydroxytoluene), 2,2'-methylenebis(4-methyl-6-tert-butylphenol), 2-ethylhexyl 3,5-di-tert-butyl-4-hydroxyphenylpropionate, 2-ethylhexyl 3-tert-butyl-4-hydroxy-5-methylphenylpropionate, tridecyl 3,5-di-tert-butyl-4-hydroxyphenylpropionate, tridecyl 3-tert-butyl-4-hydroxy-5-methylphenylpropionate, stearyl 3,5-di-tert-butyl-4-hydroxyphenylpropionate, stearyl 3-tert-butyl-4-hydroxy-5-methylphenylpropionate, bis(3,5-di-tert-butyl-4-hydroxyphenylpropionic acid) triglycol ester, bis(3-tert-butyl-4-hydroxy-5-methylphenylpropionic acid) triglycol ester, and 2,5-tert-amylhydroquinone.

The lubricating oil preferably also contains an acid acceptor that traps acid. The acid acceptor is added to the lubricating oil in an amount that is preferably at least 0.2% by mass but not more than 3.0% by mass, and more preferably at least 0.2% by mass but not more than 2.0% by mass. The amount added of the acid acceptor is preferably greater than the amount of the antioxidant.

The acid acceptor is a material that traps organic acids and inorganic acids. The acid acceptor is an ether-based or epoxy-based material. Examples of the acid acceptor include butyl glycidyl ether, glycidyl butyrate, hexyl glycidyl ether, glycidyl hexanoate, 2-ethylhexyl glycidyl ether, glycidyl 2-ethylhexanoate, neopentyl glycidyl ether, glycidyl pivalate, decyl glycidyl ether, glycidyl decanoate, stearyl glycidyl ether, glycidyl stearate, oleyl glycidyl ether, glycidyl oleate, phenyl glycidyl ether, glycidyl benzoate, toluyl glycidyl ether, xylenyl glycidyl ether, tert-butylphenyl glycidyl ether, glycidyl phthalate, and oxacyclohexylmethyl oxacyclohexylcarboxylate.

The gas bleed unit 39 is connected to the main condenser 5a and the evaporator 11. The gas bleed unit 39 is a device for bleeding gas from inside the refrigerant circulation circuit. The gas bleed unit 39 has a configuration in which, for example, an air-cooled chiller is used to cool the refrigerant extracted from the condenser, with the liquefied refrigerant then being returned to the evaporator, while the condensed gas that does not liquefy is discharged from the system using a pump or the like. The gas bleed unit 39 is able to collect refrigerant that contains air from the condenser 5, separate the air from the collected refrigerant, and then return the refrigerant to the evaporator 11. The gas bleed unit 39 can discharge the separated air outside the system via an adsorbent 40. The adsorbent 40 is a material that adsorbs the trace amounts of refrigerant in the exhaust gas. The adsorbent 40 is, for example, an activated carbon or the like.

The refrigerant supply pipe 43 is connected to the main pipe 17c that links the main expansion valve 9 and the evaporator 11. The refrigerant supply pipe 43 has a refrigerant source connection port 44 to which a refrigerant source is connected, a first on-off valve 45 that opens and closes the refrigerant source connection port 44, an exhaust unit connection port 46 to which an exhaust unit is connected, and a second on-off valve 47 that opens and closes the exhaust unit connection port 46. By connecting the refrigerant source to the refrigerant source connection port 44 and opening the first on-off valve 45, the refrigerant can be supplied to the main pipe 17c through the refrigerant supply pipe. By connecting the exhaust unit to the exhaust unit connection port 46, closing the first on-off valve 45, and opening the second on-off valve 47, gases can be discharged from the refrigerant supply pipe 43 by the exhaust unit. The exhaust unit that is connected to the exhaust unit connection port 46 is a vacuum pump or the like that can reduce the pressure inside the refrigerant supply pipe 43 down to a desired pressure.

The refrigerant supply pipe 43 is formed from a material that is impermeable to oxygen, or substantially impermeable to oxygen. The refrigerant supply pipe is preferably formed from a metal. Ideal materials for the refrigerant supply pipe include iron-based or stainless steel materials, and specific examples include SUS304 and SUS316.

Next is a description of the operation of, and the actions and effects of, the heat pump device having the structure described above.

The low-pressure gas refrigerant drawn from the evaporator 11 is compressed by the upstream impeller 3a of the compressor 3 to a medium pressure. This compressed medium-pressure gas refrigerant is then cooled by converging with the medium-pressure gas refrigerant introduced from the economizer outlet gas passage 20. The gas refrigerant that has been cooled by the medium-pressure gas refrigerant is then further compressed by the downstream impeller 3b of the compressor 3 to form a high-pressure gas refrigerant.

The high-pressure gas refrigerant discharged from the compressor 3 is guided into the condenser 5. In the condenser 5, the high-pressure gas refrigerant is cooled at substantially uniform pressure to form a high-pressure liquid refrigerant. The majority of the high-pressure liquid refrigerant passes through the main pipe 17a and is guided to the secondary expansion valve 19, whereas a minor portion of the high-pressure liquid refrigerant is guided to the cooling pipe 26 of the drive cooling unit 25.

The high-pressure liquid refrigerant that enters the secondary expansion valve 19 undergoes decompression and expansion, and adopts a gas-liquid two phase state. This gas-liquid two phase state refrigerant generated by decompression and expansion flows into the economizer 7, and is separated into a gas refrigerant and a liquid refrigerant. The gas refrigerant flows through the economizer outlet gas passage 20 and into the intermediate stage of the compressor 3, and is mixed with the medium-pressure gas refrigerant.

The liquid refrigerant separated by the economizer 7 is subjected to isenthalpic expansion down to a low pressure by the main expansion valve 9, and is then guided to the refrigerant inlet 11c of the evaporator 11.

The liquid refrigerant entering the evaporator 11 is evaporated by heat exchange with the cold water passing through the heat transfer tubes 11b (11b') and becomes a low-pressure gas refrigerant. This low-pressure gas refrigerant passes through the main pipe 17d, flows into the inlet port of the compressor 3, and is once again compressed.

Liquid refrigerant accumulates temporarily in the evaporator 11, and in those cases where water is mixed with the liquid refrigerant, the moisture rises toward the liquid surface L of the liquid refrigerant as a result of having a lighter specific gravity than the refrigerant. Because the boiling points of HFO refrigerants and HCFO refrigerants are lower than that of water, the moisture contained in the refrigerant accumulates near the liquid surface L of the evaporator. Accordingly, the moisture contained in the refrigerant contacts and is trapped by the desiccant and the acid acceptor disposed near the liquid surface L.

In the height region within a range of ±H from the horizontal plane that includes the central axis of the uppermost heat transfer tubes, because boiling of the refrigerant is marked, favorable trapping efficiency of the moisture and acid by the desiccant and the acid acceptor is achieved. By reducing the amount of moisture within the refrigerant, decomposition of the HFO refrigerant or HCFO refrigerant to generate acid can be suppressed. As a result, any increase in the acid concentration within the refrigerant is suppressed, and corrosion of the componentry within the heat pump device can be prevented.

The high-pressure liquid refrigerant guided into the cooling pipe 26 of the drive cooling unit 25 is cooled to a temperature exceeding 0° C. but less than 100° C. by the throttle valve 30. The degree of opening of the throttle valve 30 is adjusted by a control unit or the like not shown in the drawing so that the refrigerant reaches the desired temperature. By providing the throttle valve 30 on the upstream side of the filter dryer 27, the drive 15 can be cooled by the liquid refrigerant that has been condensed by the condenser 5, even in heat pump devices 1 in which the refrigerant reaches high temperatures of about 200° C. in some locations. Because the liquid refrigerant is cooled by the throttle valve 30, damage to the filter dryer 27 and the drive 15 can be avoided. In those cases where the throttle valve 30 is provided upstream, the size of the filter dryer 27 is preferably set with due consideration of pressure loss.

Having been cooled to the desired temperature by the throttle valve 30, moisture and acid in the liquid refrigerant is trapped by the desiccant and the acid acceptor disposed in the filter dryer 27. By reducing the amounts of moisture and acid in the refrigerant, decomposition of the HFO refrigerant or HCFO refrigerant to generate acid can be suppressed.

The refrigerant containing reduced amounts of moisture and acid is then introduced into the casing of the drive 15, and following cooling of the stator and the coil (not shown in the drawing), is then guided into the evaporator 11 on the low pressure side (not shown in the drawing).

The filter dryer 27 is replaced as appropriate. The timing of the replacement may be determined on the basis of the pressure difference between the inside of the refrigerant circulation circuit and the outside atmosphere, and the operating time and the like. For example, the condensing pressure and the evaporating pressure may both be measured during operation, and the filter dryer 27 then replaced when either of the two pressure values deviates beyond a prescribed tolerance. This tolerance is preferably set by preliminary testing or the like. For example, the consumption of the desiccant and the operating time may be correlated, and the timing of the replacement of the desiccant determined on the basis of the operating time. Alternatively, the consumption of the desiccant and the pressure changes in the condensing pressure and the evaporating pressure may be correlated, and the timing of the replacement of the desiccant determined on the basis of pressure changes.

Replacement of the filter dryer 27 is performed with the upstream and downstream gate valves 28 and 29 closed. By providing the gate valves 28 and 29, the desiccant can be replaced easily at a prescribed interval. The old filter dryer 27 is detached, and a new filter dryer 27 is installed. A vacuum pump or the like is used to reduce the pressure inside the new filter dryer down to a prescribed degree of vacuum, and the upstream and downstream gate valves are then opened. The "prescribed degree of vacuum" is typically 200 Pa (abs) or lower, regardless of the volume of the refrigerant circulation circuit. The degree of vacuum inside the filter dryer is set as appropriate so that the amount of oxygen in the refrigerant circulation circuit is less than 50 ppm (mass/mass) relative to the refrigerant fill amount. As a result, decomposition of the refrigerant can be suppressed.

During operation of the heat pump device 1, the lubricating oil is circulated between the lubricating oil tank 32 and the casing of the speed increaser 13. By circulating the lubricating oil containing the added antioxidant and acid acceptor, oxygen and acid inside the heat pump device 1 can be trapped. Because the inside of the heat pump device 1 is a sealed structure, the amount of oxygen inside the device does not vary significantly during normal operation, but the amount of acid increases steadily. In the present embodiment, because the lubricating oil contains a larger amount of the added acid acceptor than the antioxidant, a large amount of the acid can be trapped, meaning the lubricating oil replacement interval can be lengthened.

The lubricating oil is replaced as appropriate. The timing of the replacement is preferably determined based on the acid value of the lubricating oil. For example, a portion of the lubricating oil may be extracted from the lubricating oil tank 32 during operation, and the acid value then measured using the indicator titration method or the potentiometric titration method prescribed in JIS K 2501. The lubricating oil is replaced when the measured acid value exceeds 0.5 mgKOH/g. This can suppress any increase in the acid concentration in the refrigerant, which prevents any acceleration in the decomposition of the refrigerant, and also prevents corrosion of the componentry inside the heat pump device.

During operation of the heat pump device 1, gas bleeding is performed inside the refrigerant circulation circuit as appropriate. In the gas bleed unit 39, refrigerant that contains oxygen is collected from the condenser 5, and the oxygen is separated from the collected refrigerant. The separated oxygen is discharged into the open atmosphere through the adsorbent 40. The refrigerant from which the oxygen has been separated is returned to the evaporator 11.

By using the gas bleed unit 39 to perform gas bleeding of the inside of the refrigerant circulation circuit, a non-condensable gas containing oxygen and moisture can be discharged from the system even when the heat pump is stopped. When the heat pump is stopped, and the temperature of the cooling water flowing through the condenser is lower than the temperature of the cold water flowing through the evaporator, the refrigerant liquid level inside the evaporator may sometimes fall to a height position that is −H below the horizontal plane that includes the central axis of the uppermost heat transfer tubes, meaning the desiccant disposed in the evaporator cannot be used to trap moisture.

In the heat pump device 1, the refrigerant circulation circuit is filled with a refrigerant. Filling of the refrigerant is performed in the following manner. First, a refrigerant cylinder is connected to the refrigerant source connection port 44 of the refrigerant supply pipe 43. A vacuum pump is connected to the exhaust unit connection port 46. The first on-off valve 45 is closed, and the second on-off valve 47 is opened. The vacuum pump is activated, and the air inside the refrigerant supply pipe and the refrigerant circulation circuit is evacuated. The evacuation is performed until the pressure inside the refrigerant supply pipe and the refrigerant circulation circuit is not more than 200 Pa (abs) and the amount of oxygen inside the refrigerant circulation circuit relative to the amount of refrigerant to be filled is less than 50 ppm (mass/mass). Following completion of the evacuation, the second on-off valve 47 is closed, and the first on-off valve is opened. The refrigerant is supplied from the refrigerant cylinder, through the refrigerant supply pipe 43, and into the refrigerant circulation circuit. By performing the refrigerant filling in this manner, the amount of oxygen introduced into the refrigerant circulation circuit can be reduced, and decomposition of the refrigerant can be suppressed.

{Second Embodiment}

With the exception of having a different drive cooling unit, a heat pump device according to this embodiment has the same structure as the first embodiment. Those structures that are the same as the first embodiment are labeled with the same reference signs, and description of those structures is omitted.

Figure 3:
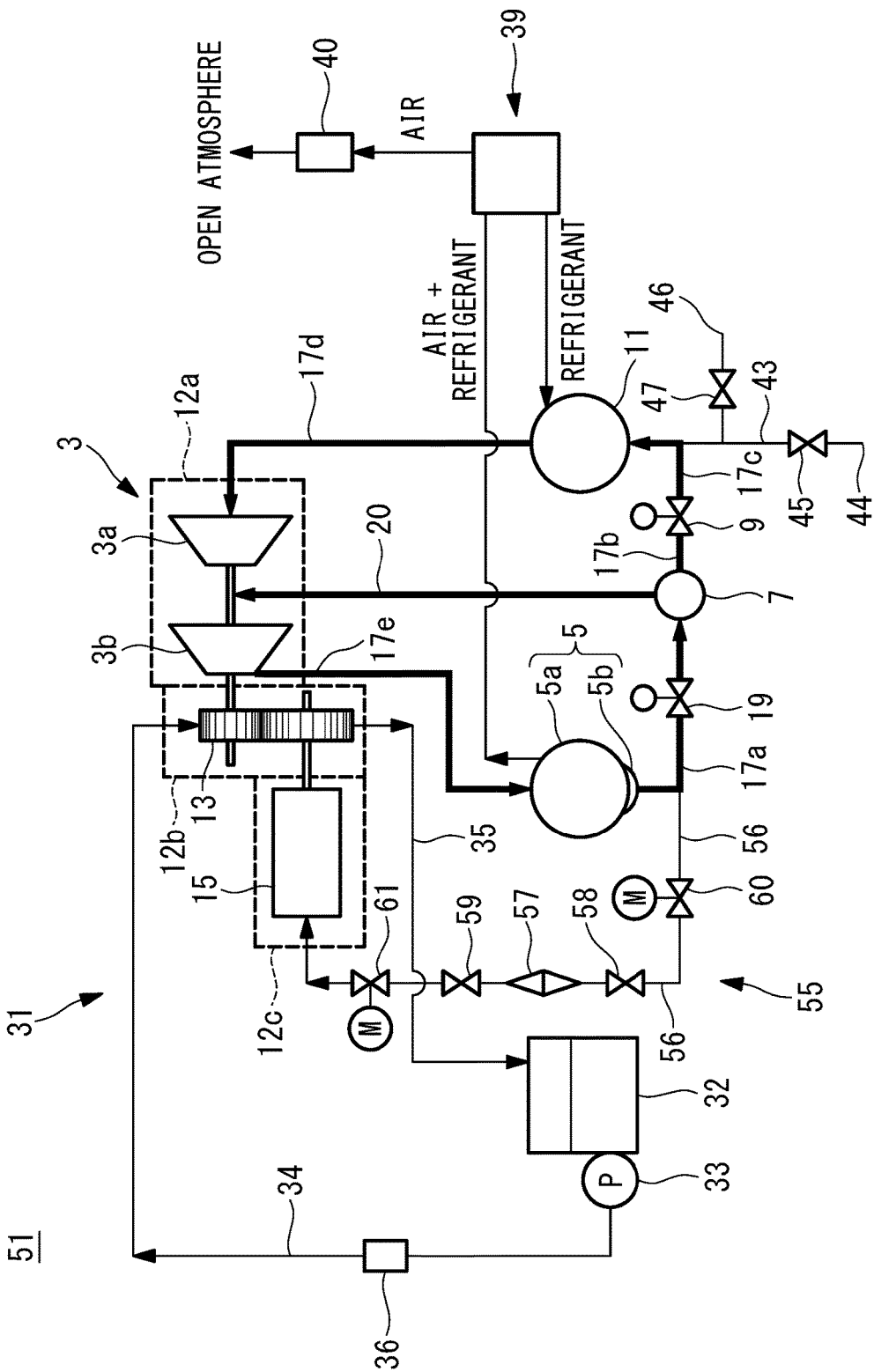
{FIG. 3} A schematic illustration of a refrigerant circulation device according to a second embodiment.

FIG. 3 is a schematic illustration of a heat pump device 51 according to this embodiment. A drive cooling unit 55 includes a cooling pipe 56, which links the main pipe 17a on the outlet side of the condenser 5 and the casing 12c that houses the drive 15, and functions as a passage for the refrigerant, a filter dryer 57 provided partway along the cooling pipe 56, gate valves 58 and 59 provided upstream and downstream respectively of the filter dryer 57, a first throttle valve 60 provided on the upstream side of the filter dryer 57 and the gate valves 58 and 59, and a second throttle valve 61 provided on the downstream side of the filter dryer 57 and the gate valves 58 and 59. The cooling pipe 56, the filter dryer 57, and the gate valves 58 and 59 have the same structures as those described for the first embodiment.

When the temperature of the high-pressure liquid refrigerant condensed and discharged from the condenser 5 is 100° C. or higher, the high-pressure liquid refrigerant is cooled to a temperature exceeding 0° C. but less than 100° C. by the first throttle valve 60. The degree of opening of the first throttle valve 60 is adjusted by a control unit or the like not shown in the drawing so that the refrigerant reaches the desired temperature. On the other hand, when the temperature of the high-pressure liquid refrigerant condensed and discharged from the condenser 5 is less than 100° C., the degree of opening of the first throttle valve 60 may be set to 100%, and the high-pressure liquid refrigerant is cooled by the second throttle valve 61. The degree of opening of the second throttle valve 61 is adjusted by a control unit or the like not shown in the drawing so that the refrigerant reaches the desired temperature. The control unit can adjust the degrees of opening of the first throttle valve 60 and the second throttle valve 61 in accordance with the temperature of the high-pressure liquid refrigerant.

If the liquid refrigerant is cooled by the first throttle valve 60 on the upstream side of the filter dryer 57, then the liquid refrigerant may flow less easily due to the temperature of the liquid refrigerant. In such cases, the liquid refrigerant can be guided into the casing 12c of the drive 15 by switching to the second throttle valve 61 on the downstream side.

{Third Embodiment}

With the exception of having a different drive cooling unit, a heat pump device according to this embodiment has the same structure as the first embodiment. Those structures that are the same as the first embodiment are labeled with the same reference signs, and description of those structures is omitted.

Figure 4:
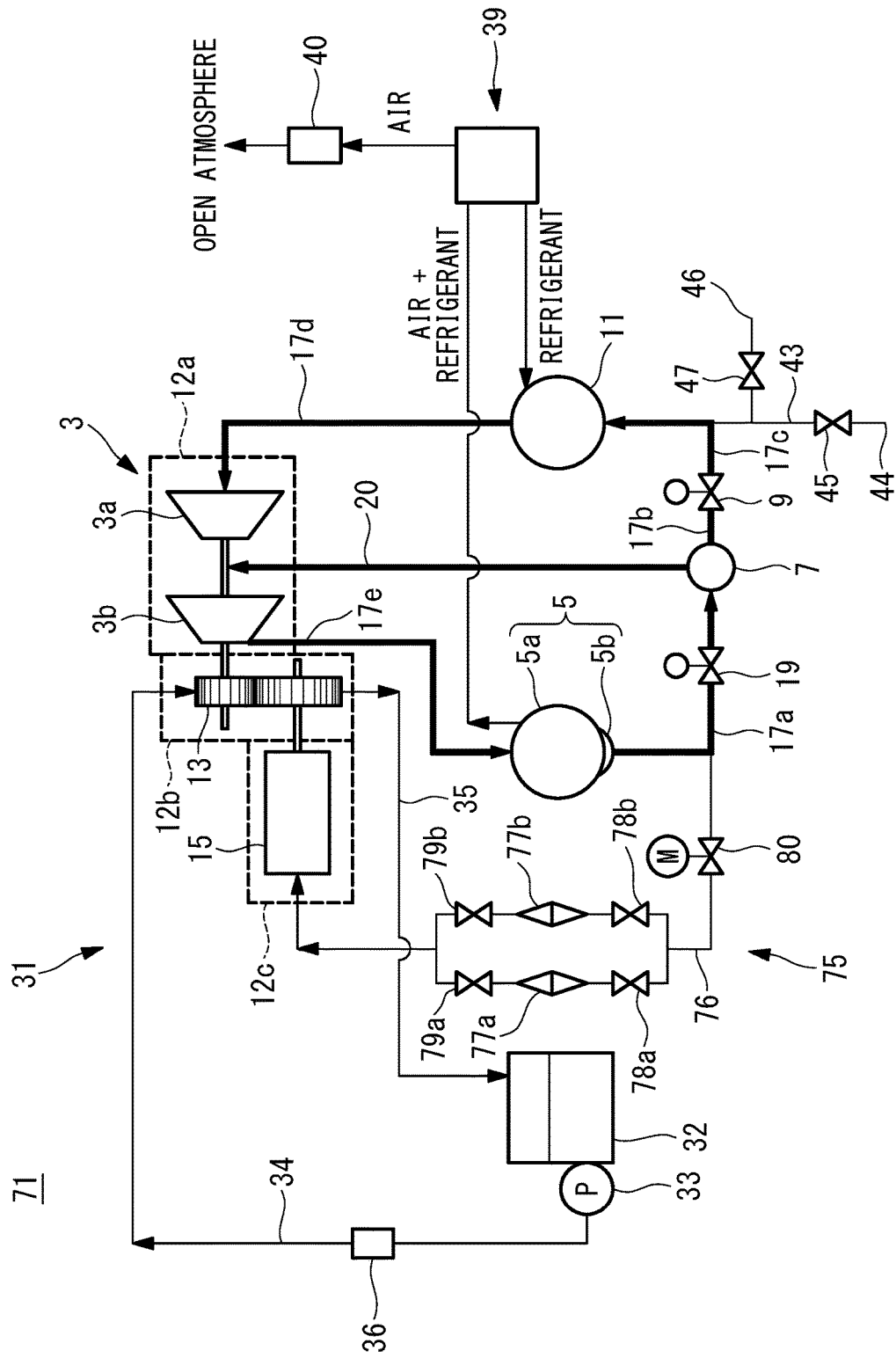
{FIG. 4} A schematic illustration of a refrigerant circulation device according to a third embodiment.

FIG. 4 is a schematic illustration of a heat pump device 71 according to this embodiment. A drive cooling unit 75 includes a cooling pipe 76, which links the main pipe 17a on the outlet side of the condenser 5 and the casing 12c that houses the drive 15, and functions as a passage for the refrigerant, a plurality of filter dryers 77a and 77b provided in parallel partway along the cooling pipe 76, gate valves 78a and 79a provided upstream and downstream respectively of the filter dryer 77a, gate valves 78b and 79b provided upstream and downstream respectively of the filter dryer 77b, and a throttle valve 80 provided on the upstream side of the filter dryers 77a and 77b and the gate valves 78a and 78b.

Each of the filter dryers 77a and 77b has the same structure as the filter dryer 27 of the first embodiment. Each of the gate valves 78a, 78b, 79a and 79b has the same structure as the gate valves 28 and 29 of the first embodiment. The degree of opening of the throttle valve 80 is adjusted by a control unit not shown in the drawing, so that the refrigerant temperature during operation exceeds 0° C. but is less than 100° C.

In this embodiment, by disposing the filter dryers 77a and 77b, each having upstream and downstream gate valves, in a parallel arrangement, replacement of the filter dryers can be performed without stopping the flow of the refrigerant that cools the drive 15. For example, when replacing the filter dryer 77a, the gate valves 78b and 79b are opened and the gate valves 78a and 79a are closed, and the filter dryer 77a may then be removed.

{Fourth Embodiment}

A feature of this embodiment relates to the refrigerant filling method used when replacing the refrigerant. With the exception of including a notification unit, a heat pump device according to this embodiment has the same structure as the first embodiment. Those structures that are the same as the first embodiment are labeled with the same reference signs, and description of those structures is omitted.

Figure 5:
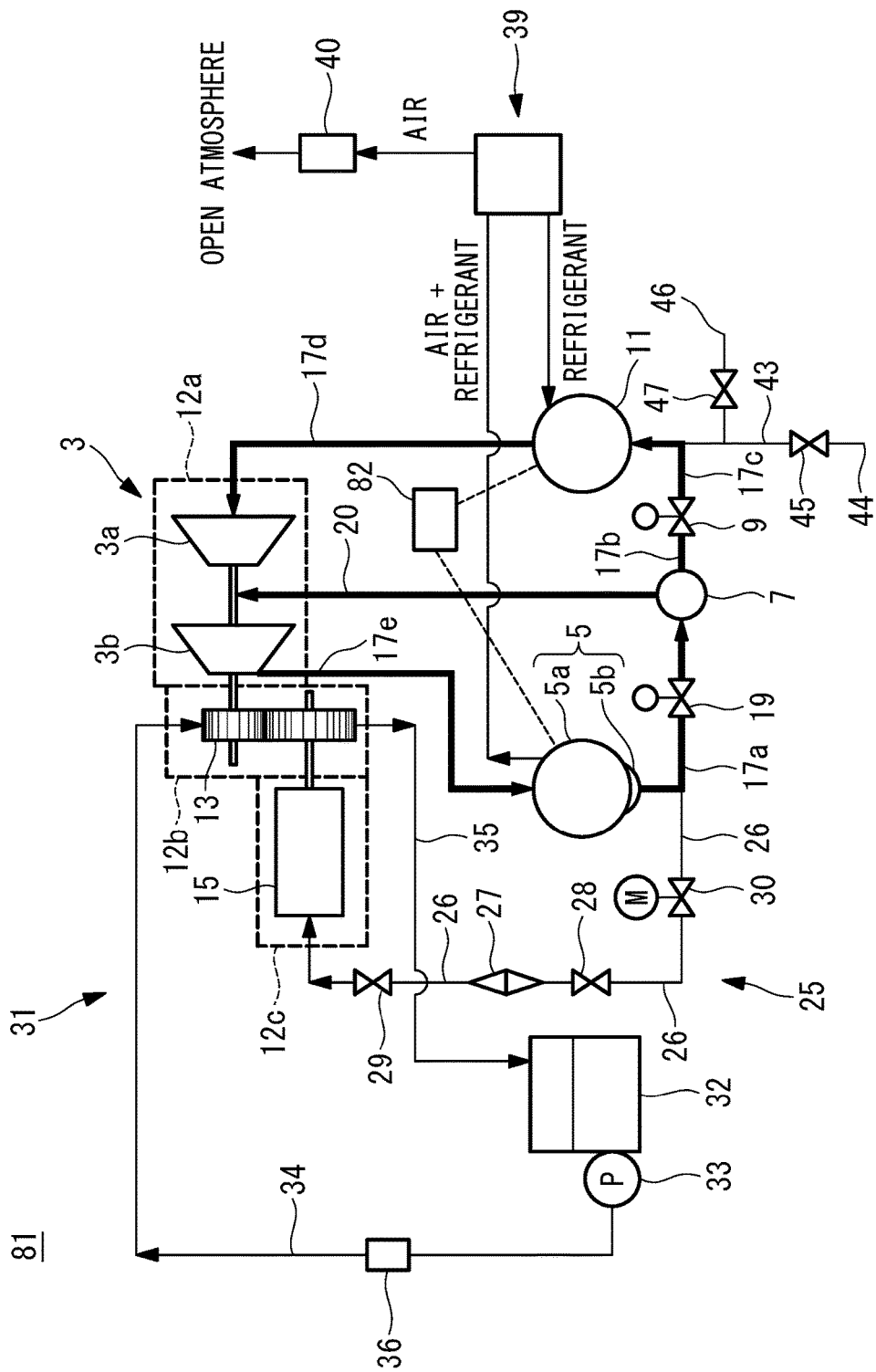
{FIG. 5} A schematic illustration of a refrigerant circulation device according to a fourth embodiment.

FIG. 5 is a schematic illustration of a heat pump device 81 according to this embodiment. A notification unit 82 measures the condensing pressure and the evaporating pressure of the refrigerant during operation, and can notify the timing for refrigerant replacement when the measured value of at least one of the condensing pressure and the evaporating pressure falls outside a predetermined tolerance.

The refrigerant used to fill the heat pump device 81 contains a hydrofluoroolefin (HFO) or hydrochlorofluoroolefin (HCFO). The HFO or HCFO has stereoisomers with different boiling points. In this description, at a given saturation temperature, one of the isomers that adopts a lower pressure is defined the "low-pressure stereoisomer" and the other isomer that adopts a higher pressure is defined the "high-pressure stereoisomer".

Refrigerants that have a low-pressure stereoisomer and a high-pressure stereoisomer include 1233zd, 1234ze and 1223xd, but this is not an exhaustive list.

In the case of 1233zd, the Z isomer (1233zd(Z)) is the low-pressure stereoisomer, and the E isomer (1233zd(E)) is the high-pressure stereoisomer.

In the case of 1234ze, the Z isomer (1234ze(Z)) is the low-pressure stereoisomer, and the E isomer (1234ze(E)) is the high-pressure stereoisomer.

In the case of 1223xd, the E isomer (1223xd(E)) is the low-pressure stereoisomer, and the Z isomer (1223xd(Z)) is the high-pressure stereoisomer.

In the present embodiment, based on the relationship between the pressure and the saturation temperature, which depends on the ratio between the low-pressure stereoisomer and the high-pressure stereoisomer in the refrigerant, a pressure change tolerance is determined in advance. The condensing pressure and the evaporating pressure are then measured inside the refrigerant circulation circuit during operation, and when the change in at least one of these pressures falls outside the determined tolerance, the refrigerant is replaced with new refrigerant. This "pressure change tolerance" is a value determined by the limit permissible by the performance of the heat pump device. The "limit permissible by the performance of the heat pump device" is determined by the evaporating pressure. A comprehensive airtightness test performed at the time of the heat pump production is performed at 1.05 times the design pressure, and therefore in the case of a design for 100% by mass of the low-pressure stereoisomer (1234ze(Z)), the point where the evaporating pressure reaches 1.05 times the design pressure becomes the "pressure change upper limit". In one example, in the case where the evaporating design pressure is the pressure equivalent to a saturation temperature of 100° C., the evaporating pressure exceeds 1.05 times the design pressure at the point where the low-pressure stereoisomer (1234ze(Z)) reaches 96% by mass and the high-pressure stereoisomer (1234ze(E)) reaches 4% by mass.

Figure 6:
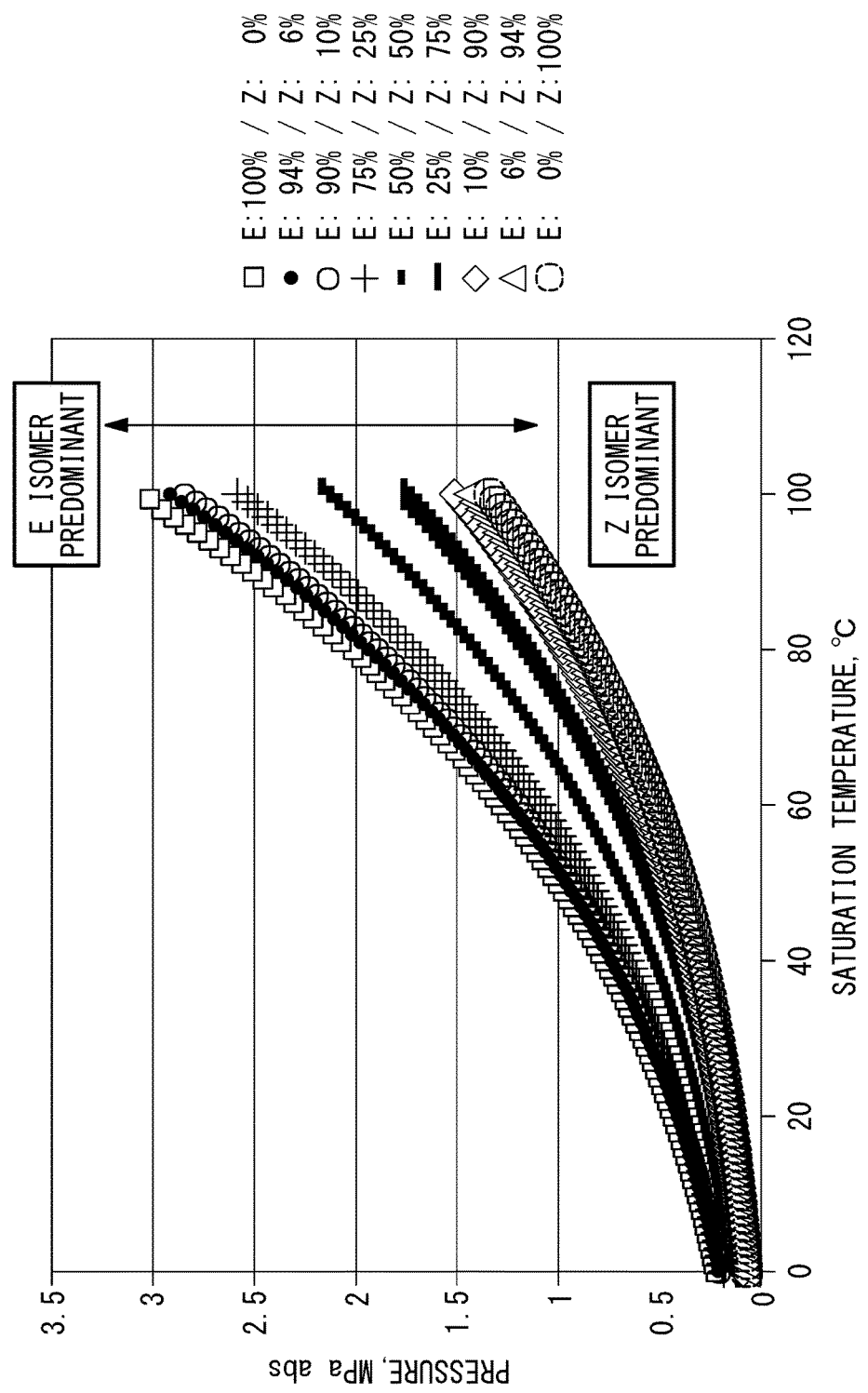
{FIG. 6} A diagram illustrating the relationship between the saturation temperature and the pressure depending on the isomer ratio.

FIG. 6 illustrates the relationship between the saturation temperature and the pressure for various ratios between the low-pressure stereoisomer (1234ze(Z)) and the high-pressure stereoisomer (1234ze(E)). In the drawing, the horizontal axis represents the saturation temperature (° C.) and the vertical axis represents the pressure (MPa, abs).

The isomers 1234ze(Z) and 1234ze(E) have different pressures at a given saturation temperature. For example, at a saturation temperature of 100° C., the pressure of a refrigerant composed of only 1234ze(Z) (high-pressure stereoisomer (E): 0% by mass/low-pressure stereoisomer (Z): 100% by mass) was about 1.34 MPa, whereas the pressure of a refrigerant composed of only 1234ze(E) (high-pressure stereoisomer (E): 100% by mass/low-pressure stereoisomer (Z): 0% by mass) was about 3.03 MPa.

The pressure increased as the proportion of the high-pressure stereoisomer (E) in the refrigerant increased. The pressure decreased as the proportion of the low-pressure stereoisomer (Z) in the refrigerant increased. In the case of a refrigerant composed of high-pressure stereoisomer (E): 50% by mass/low-pressure stereoisomer (Z): 50% by mass, the pressure at 100° C. was about 2.17 MPa.

{Fifth Embodiment}

A feature of this embodiment involves performing the initial refrigerant filling using a refrigerant in which the isomerization reaction adopts an equilibrium state. Here, the expression that the "isomerization reaction adopts an equilibrium state" may be a state in which the ratio between the low-pressure stereoisomer and the high-pressure stereoisomer varies within the pressure change range permissible by the performance of the heat pump device, and need not necessarily be the exact equilibrium.

In this embodiment, a refrigerant having an isomer ratio that has been set so that the fluctuation ranges for the condensing pressure and the evaporating pressure of the refrigerant during operation inside the refrigerant circulation circuit fall within prescribed ranges is used for initial filling of the heat pump device. The isomer ratio is determined by preliminary testing. In this preliminary testing, the temperature and pressure of the refrigerant are changed, and the point at which the ratio between the low-pressure stereoisomer and the high-pressure stereoisomer finally stabilizes (reaches an equilibrium state) is ascertained.

For example, using an HFO refrigerant, durability testing is performed by changing the temperature and pressure. If the ratio between the HFO low-pressure stereoisomer and the HFO high-pressure stereoisomer in the refrigerant following this durability testing is 7:3, then this ratio is used as the isomer ratio. A refrigerant in which the isomer ratio has been adjusted to 7:3 (low-pressure stereoisomer/high-pressure stereoisomer) is then used for initial filling of the refrigerant circulation circuit.

The fourth embodiment and the fifth embodiment may each be combined with any of the first through third embodiments.

The first through third embodiments are particularly ideal for those cases where a refrigerant containing 1233zd, which is particularly prone to the effects of oxygen, is used for the refrigerant filling.

REFERENCE SIGNS LIST 1, 51, 71, 81 Heat pump device (refrigerant circulation device)
3 Compressor
5 Condenser
7 Economizer
9 Main expansion valve (expansion valve)
11 Evaporator
11a Container
11b Heat transfer tube
11c Refrigerant inlet
11d Refrigerant outlet
12a Casing (housing the compressor)
12b Casing (housing the speed increaser)
12c Casing (housing the drive)
13 Speed increaser
15 Drive
17a, 17b, 17c, 17d, 17e Main pipe
19 Secondary expansion valve (expansion valve)
20 Economizer outlet gas passage
21 Desiccant
23 Stay
25 Drive cooling unit
26 Cooling pipe
27, 57, 77a, 77b Filter dryer (filtration unit, containing a desiccant)
28, 29, 58, 59, 78a, 78b, 79a, 79b Gate valve
30, 80 Throttle valve
31 Lubricating oil circulation unit
32 Lubricating oil tank
33 Pump
34 Oil supply pipe
35 Oil discharge pipe
36 Oil filter
39 Gas bleed unit
40 Adsorbent
43 Refrigerant supply pipe
44 Refrigerant source connection port 45 First on-off valve
46 Exhaust unit connection port
47 Second on-off valve
60 First throttle valve
61 Second throttle valve
82 Notification unit

The invention claimed is:

1. A refrigerant circulation method for use in a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within a molecular structure thereof, wherein
the method comprises circulating the refrigerant with a desiccant that can trap moisture disposed in a location where an operating temperature of the refrigerant exceeds 0° C. but is less than 100° C.
a refrigerant supply pipe connected to the main pipe is a metal pipe, and
inside the refrigerant supply pipe is evacuated so that an amount of oxygen remaining in the refrigerant circulation circuit relative to an amount of refrigerant to be filled is less than 50 ppm (mass/mass), the refrigerant is subsequently used to fill the refrigerant circulation circuit, and the refrigerant is then circulated.

2. The refrigerant circulation method according to claim 1, wherein
the evaporator is a shell and tube evaporator having a circular cylindrical container that houses the refrigerant, and a plurality of heat transfer tubes arranged inside the container, and
if a distance between a center of an uppermost heat transfer tube and a center of a lowermost heat transfer tube is deemed H, and a direction of gravity is deemed to be downward, then the desiccant is disposed inside the container within a region of ±H from a horizontal plane that includes a central axis of the uppermost heat transfer tube.

3. The refrigerant circulation method according to claim 1, wherein the condensed refrigerant is guided through a filter dryer which is a filtration unit having the desiccant disposed therein, to a drive that drives the compressor, thereby cooling the drive.

4. The refrigerant circulation method according to claim 1, wherein an acid acceptor that traps acid is disposed together with the desiccant.

5. The refrigerant circulation method according to claim 1, wherein an aromatic-based or phenol-based antioxidant is added to a lubricating oil supplied to the refrigerant circulation device.

6. The refrigerant circulation method according to claim 5, wherein the antioxidant is added to the lubricating oil in an amount of at least 0.2% by mass but not more than 1.5% by mass.

7. The refrigerant circulation method according to claim 1, wherein an ether-based or epoxy-based acid acceptor is added to a lubricating oil supplied to the refrigerant circulation device.

8. The refrigerant circulation method according to claim 7, wherein the acid acceptor is added to the lubricating oil in an amount of at least 0.2% by mass but not more than 3% by mass.

9. The refrigerant circulation method according to claim 7, wherein an amount of the acid acceptor added to the lubricating oil is larger than an amount of an antioxidant.

10. The refrigerant circulation method according to claim 1, wherein an acid value of a lubricating oil circulating in the refrigerant circulation device is measured, and the lubricating oil is replaced when the acid value of the lubricating oil exceeds 0.5 mgKOH/g.

11. The refrigerant circulation method according to claim 1, wherein the refrigerant supply pipe is formed from a stainless steel.

12. The refrigerant circulation method according to claim 1, wherein a condensing pressure and an evaporating pressure of the refrigerant are measured during operation, and the refrigerant is replaced when a measured value of at least one of the condensing pressure and the evaporating pressure falls outside a predetermined tolerance.

13. The refrigerant circulation method according to claim 1, wherein a stereoisomer ratio is acquired that ensures that fluctuation ranges for a condensing pressure and an evaporating pressure of the refrigerant during operation fall within prescribed ranges, initial refrigerant filling is then performed at said stereoisomer ratio, and the refrigerant is then circulated.

14. A refrigerant circulation method for use in a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within a molecular structure thereof, wherein
the method comprises circulating the refrigerant with a desiccant that can trap moisture disposed in a location where an operating temperature of the refrigerant exceeds 0° C. but is less than 100° C., and
a stereoisomer ratio is acquired that ensures that fluctuation ranges for a condensing pressure and an evaporating pressure of the refrigerant during operation fall within prescribed ranges, initial refrigerant filling is then performed at said stereoisomer ratio, and the refrigerant is then circulated.

15. A refrigerant circulation method for use in a refrigerant circulation device having a compressor, a condenser, an expansion valve and an evaporator connected by a main pipe to form a refrigerant circulation circuit through which a refrigerant is circulated, the refrigerant circulation circuit being filled with a refrigerant containing a hydrofluoroolefin or a hydrochlorofluoroolefin having a carbon-carbon double bond within a molecular structure thereof, wherein
the method comprises circulating the refrigerant with a desiccant that can trap moisture disposed in a location where an operating temperature of the refrigerant exceeds 0° C. but is less than 100° C.,
the evaporator is a shell and tube evaporator having a circular cylindrical container that houses the refrigerant, and a plurality of heat transfer tubes arranged inside the container, and
the desiccant is disposed inside the container within a region of ±H from a horizontal plane that includes a central axis of an uppermost heat transfer tube, H being deemed a distance between a center of the uppermost heat transfer tube and a center of a lowermost heat transfer tube, and a direction of gravity being deemed to be downward.

* * * * *